Oct. 28, 1952  L. A. DE MORE  2,615,309
REFRIGERATING APPARATUS FOR FREEZING FOOD
Filed Sept. 12, 1950  2 SHEETS—SHEET 2
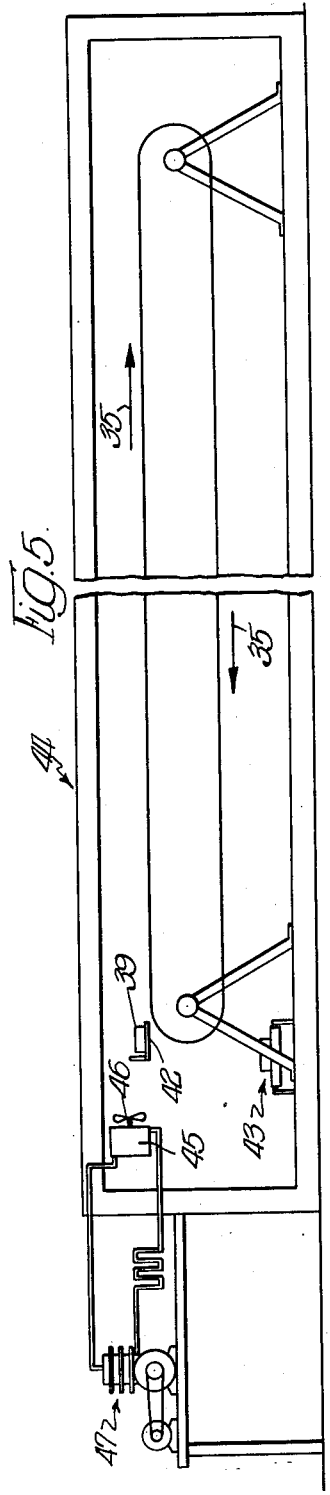
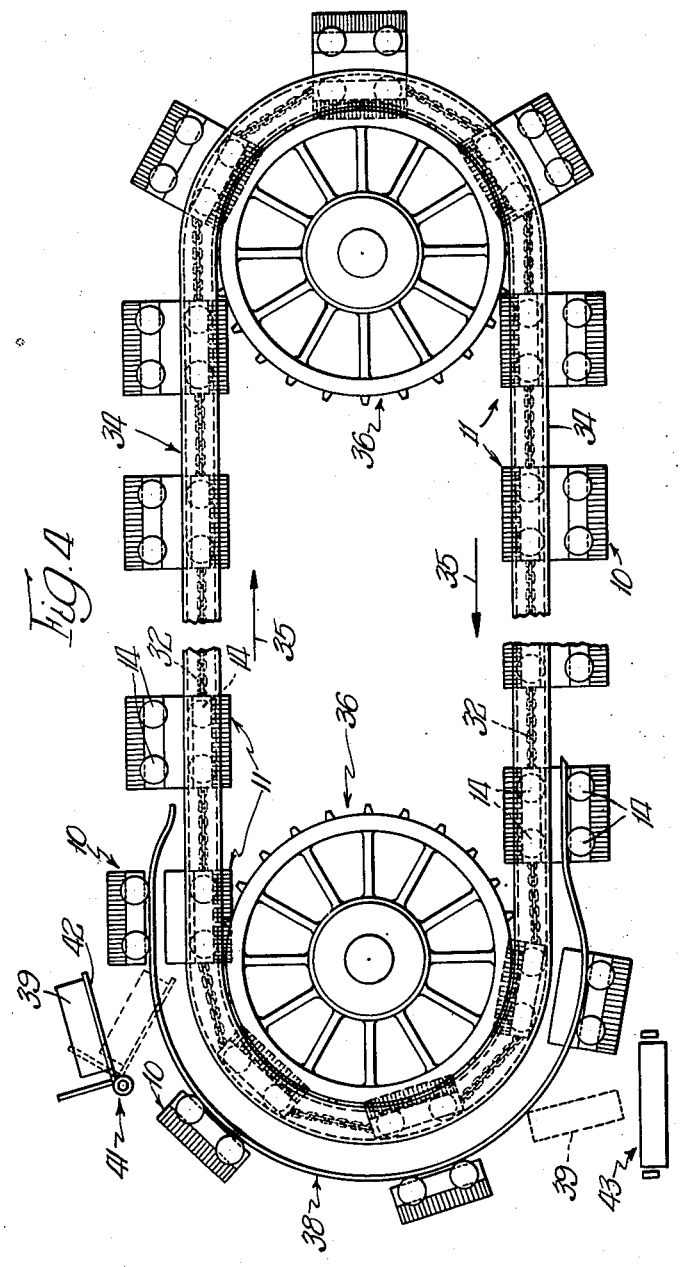
INVENTOR.
Leonel A. De More, Patented Oct. 28, 1952

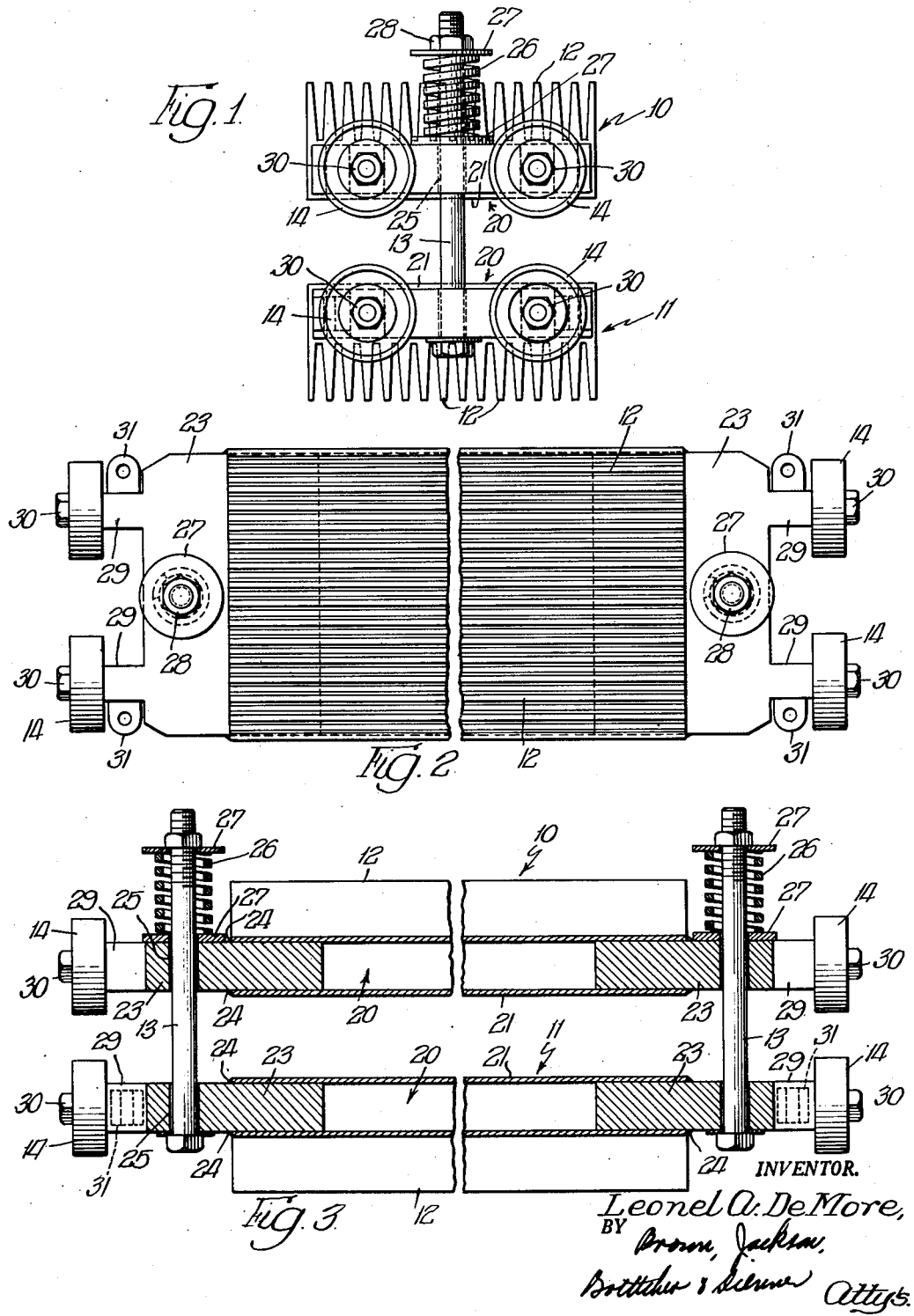

2,615,309

UNITED STATES PATENT OFFICE 2,615,309

REFRIGERATING APPARATUS FOR FREEZING FOOD

Leonel A. De More, Clearwater, Fla.

Application September 12, 1950, Serial No. 184,373

7 Claims. (Cl. 62—102)

My invention relates to the freezing of foodstuffs, particularly packaged food-stuffs, and contemplates a new and improved apparatus for that purpose.

The underlying idea of my invention is to dispose the food packages, usually of prismatic form, under pressure between surfaces of units designed for rapid cooling by a completely enveloping flow of refrigerated air in a closed insulated chamber, and to do so by continuous operation during movement of such units, with their packages, from point of entry to point of exit.

It will best serve the purposes of this description to refer firstly to said units (herein referred to as freezing units) and their details, then their assembly into a conveyor, and then the organization of such assembly in the freezing chamber and with the means for refrigerating and circulating the air therein.

In the accompanying drawings:

Figure 1 is a side elevational of one of my freezing units;

Figure 2 is a plan view thereof, the view being broken to indicate any desired length;

Figure 3 is a front elevational view thereof, with parts shown in section, the view being broken as in Figure 2;

Figure 4 is a side elevation view, on a smaller scale, of the assembly into a conveyor, the view being broken to indicate any desired length, and showing associated feeding and discharging means; and Figure 5 is a side elevational view schematically showing the installation of such conveyor in the freezing chamber, the view being broken to indicate any desired length.

As seen in Figures 1, 2 and 3, my freezing unit comprises upper and lower freezing heads, 10 and 11 respectively, presenting opposed contact surfaces, and each having an extended radiating surface, here specifically shown in the form of a plurality of cooling fins 12 extending upwardly and downwardly, respectively. Tie bolts 13 interconnect the two freezing heads, and each head is provided with rollers 14 for engagement with tracks, as will presently appear.

The upper and lower freezing heads 10 and 11 are substantially identical, each comprising a hollowed-out metal member 20, which members are adapted to be maintained in spaced horizontal and parallel relation for carrying a package of food between the opposed inner surfaces 21 thereof. These surfaces should be of an area sufficient to coextend with the contacting surfaces of the food package, one or more as the case may be. Each member 20 is preferably formed as a hollow metal extrusion or casting having the extended fins 12 formed as an integral part thereof, though other ways of increasing the radiating surface may be employed.

Blocks 23, 23, preferably of cast metal, are inserted in the open ends of each member 20, as best seen from Figures 2 and 3, these blocks being fastened in place, as by welded joints 24, sealing the hollowed-out portion of the members 20, 20. These hollowed-out portions may be filled with an eutectic, serving as a cold storage medium to accelerate the cooling.

The tie bolts 13, 13 are inserted through registering openings 25, 25, provided for this purpose in blocks 23, 23, whereby the two heads are positioned in registering relation one over the other, providing the package carrying space therebetween. A compression spring 26 surrounds the upper end of each bolt 13, outwardly of the upper head 10, and between washers 27, the upper one of which is stopped by nut 28. Thus the heads are urged toward each other, in a manner and for purposes which will presently appear.

The wheels 14, 14, previously mentioned are journaled on stub shafts on extensions 29, 29, on the blocks 23, 23, keeper nuts 30, 30 being provided on the ends of such shafts. Each of the extensions 29, 29 on the lower head 11 is provided with an apertured outwardly extending lug 31, those lugs being for the reception of connecting linkages, such as chains 32, 32 (Figure 4), when the units are assembled in the conveyor set-up, which will now be described.

Referring now to Figure 4, it will be seen that I form an endless conveyor comprising a plurality of my freezing units connected by the linkages 32, the same being supported by endless channel tracks 34, one on each side, receiving the rollers 14, 14 of the lower heads 11, 11, and being driven in the direction of the arrows 35, 35 by the sprocket wheels 36, 36, the teeth of which can conveniently be made to engage the extensions 29, 29 on the blocks 23, 23.

A camming track 38 is disposed around the loading and discharging end of each track 34, to be engaged by the rollers 14, 14 of the upper heads 10, 10 of the freezing units, thus to separate the heads of each unit, against the pressure of the springs 26, 26, as they approach the point of discharge, and to keep the heads so separated until the unit reaches the point of loading.

Packages of food to be frozen are shown at 39, 39, and loading mechanism is indicated at 41. Packages of food to be frozen are placed on tilting shelf 42, and they then pass down between the separated heads of a unit about to leave the camming track 38 on the upper run. When the unit has left the camming track, the package or packages contained thereby are held between the heads, under the pressure of the springs 26, 26, and so they remain until the unit reaches the camming track 38 on the lower run, where the heads are separated, as previously described, so that the frozen food package may pass to a crossbelt or other conveyor, indicated at 43, and be carried away. The length of the freezing conveyor and its rate of travel are so selected that the length of time of movement from point of entry to point of exit of each package is sufficient to effect the freezing thereof.

In schematic Figure 5, I illustrate the mounting of the conveyor I have described in an insulated chamber 44, with the heat exchanger 45 and blower 46, of refrigerating plant 47, located within it. Thus continuously refrigerated air is circulated in the chamber, completely enveloping the freezing units and the food packages contained thereby, all to the end of effecting freezing of the food-stuffs by continuous and economical operation of simple apparatus, inexpensive in first cost and in maintenance.

From the above, it will follow and be obvious to those skilled in the art, that mechanical changes can be made in my freezing units without departing from the spirit and scope of my invention; also, similarly, that there may be alterations in the conveyor set-up, which may be in vertical position if desired, or may indeed be in the form of a large slowly moving wheel with the lower heads of the freezing units rigidly mounted on its periphery. Accordingly, I desire that the scope of my invention be measured by the following claims, broad or narrow as the case may be.

I claim:

1. A freezing apparatus comprising an insulated chamber, means for circulating refrigerated air therein, and, in said chamber, a plurality of individual articulately and endlessly interconnected freezing units and means for moving the same from point of entry to point of exit of articles to be frozen, said freezing units each comprising a pair of registeringly interconnected cooperating freezing heads presenting opposed separated surfaces between which individual articles to be frozen may be held and having fins conductively connected therewith, and springs urging said heads toward each other for applying pressure to said articles therebetween, and means for separating said pairs of heads to discharge said articles carried thereby as each unit approaches said point of exit and for permitting their relative movement toward each other for receiving an article to be frozen as they move past said separating means and leave said point of entry.

2. A freezing apparatus in the form of a conveyor, comprising a plurality of articulately and endlessly connected freezing units, each unit comprising a pair of interjoined cooperating heads presenting separated opposed plane surfaces between which articles to be frozen may be held and having extended radiating surfaces conductively connected therewith, springs urging said heads toward each other, rollers on each head, a channel track for supporting the rollers of one of said heads, and a camming track adjacent one portion of said channel track for engaging the rollers of the other of said heads, said camming track adjacent one portion of said channel track extending from the point of exit to the point of entry of the articles to be frozen and being positioned to move said heads apart at said point of exit and to permit their movement together at said point of entry.

3. A freezing apparatus in the form of a continuous conveyor, comprising a plurality of freezing units connected in series by articulated linkages, each said units comprising a pair of cooperating heads connected to register with each other and presenting opposed plane surfaces between which articles to be frozen may be held and having a plurality of radiating fins extending therefrom, springs urging said heads toward each other, and rollers on each head, an endless channel track for the rollers of one of said heads, loading mechanism and discharge mechanism at points relative to said track, and a camming track for engaging the rollers of the other of said heads positioned to separate said heads at said discharge mechanism and to permit them to move together at said loading mechanism.

4. A freezing unit for freezing packaged food by means of circulated refrigerated air, comprising, in combination, a pair of cooperating upper and lower freezing heads having opposed, adjacent planar faces, a plurality of air cooling fins projecting outwardly from each of said heads forming one surface thereof, means for maintaining said heads in registering spaced-apart parallel relation to provide a package receiving and carrying space between said planar faces thereof, spring means for permitting resilient movement of said upper head toward and away from said lower head, whereby said heads may be loaded with a food package therebetween, and roller means mounted on each of said heads for rollingly supporting said unit on a track.

5 A freezing unit for freezing packaged food by means of circulated refrigerated air, comprising, in combination, a pair of cooperating upper and lower freezing heads, each of said heads being hollow for the storage therein of a eutectic, a plurality of air-cooling fins formed integrally with each of said heads and projecting outwardly therefrom, interconnecting means for maintaining said heads in a spaced-apart registering parallel relation, one above the other, to provide a package receiving and carrying space therebetween, spring means associated with said interconnecting means for permitting resilient movement of said upper head toward and away from said lower head, roller means associated with each of said heads at the lateral extremities thereof, the rollers associated with said lower head being adapted to support said unit on continuous conveyor tracks, and said two heads being separated for loading and unloading of a food package therebetween by periodic engagement of said rollers associated with said upper head with a camming surface supported adjacent said conveyor tracks.

6. A system for freezing packaged foods in an insulated room by means of refrigerated air, comprising a continuous conveyor having a plurality of articulately and endlessly interconnected individual freezing units, each of said units comprising separated upper and lower freezing heads interconnected for relative movement to receive and hold an individual food package between opposed planar face thereof, each of said heads having a plurality of air cooling fins projecting therefrom to be enveloped by refrigerated air circulated thereacross, rollers mounted on each of said heads; the rollers on said lower heads supporting said unit on a pair of separated, side-by-side, endless conveyor tracks in said room, means for moving said conveyor along said tracks, a refrigerating unit for cooling the air in said room, fan means for circulating said refrigerated air over said freezing heads and the individual packages between them, and additional track means periodically engageable with said rollers on said upper heads for separating said heads at a station along said conveyor tracks for loading and unloading said packages.

7. In a continuous system for freezing packaged foods in an insulated room by means of circulated refrigerated air, a conveyor in said room comprising a plurality of interconnected freezing units, each of said units comprising a pair of separated freezing heads, each having a chamber containing a eutectic, said heads having a plurality of separated air cooling fins formed integrally therewith and projecting therefrom and having rollers associated therewith for supporting said units on conveyor tracks in said room, means for moving said units on said tracks, means for refrigerating the air in said room, fan means for circulating said refrigerated air in said room and against said freezing heads, and cam means adjacent said tracks for periodically contacting the rollers associated with one of said heads of each of said units to separate said heads for the discharge and loading of a food package therebetween, conveyor means for carrying frozen packages discharged from said units away from said room; and loading means associated with said freezing conveyor for supplying food packages to said freezing units.

LEONEL A. DE MORE.

REFERENCES CITED

The following references are of record in the file of this patent:

UNITED STATES PATENTS

| Number | Name | Date |
|---|---|---|
| 1,817,890 | Birdseye | Aug. 4, 1931 |
| 1,847,956 | Giger | Mar. 1, 1932 |
| 1,939,334 | Burke | Dec. 12, 1933 |
| 1,953,521 | Vogt | Apr. 3, 1934 |
| 2,027,255 | Vogt | Jan. 7, 1936 |
| 2,260,450 | Guinane | Oct. 28, 1941 |